United States Patent [19]

Steele

[11] Patent Number: 5,228,845
[45] Date of Patent: Jul. 20, 1993

[54] EXTERNAL SHAFT BEARING ASSEMBLY
[75] Inventor: Duane F. Steele, Onsted, Mich.
[73] Assignee: Ford Motor Company, Dearborn, Mich.
[21] Appl. No.: 905,693
[22] Filed: Jun. 30, 1992
[51] Int. Cl.⁵ .................. F04C 18/04; F04C 29/00; F16C 19/54; F16D 23/00
[52] U.S. Cl. .................. 418/55.1; 418/69; 192/110 B; 384/461
[58] Field of Search .............. 418/55.1, 69; 384/461; 192/84 C, 110 B

[56] References Cited

U.S. PATENT DOCUMENTS

| | | | |
|---|---|---|---|
| 2,518,159 | 8/1950 | Martin | 384/461 |
| 4,432,708 | 2/1984 | Hiraga et al. | 418/55.1 |
| 4,604,039 | 8/1986 | Terauchi | 418/55.1 |
| 4,673,340 | 6/1987 | Mabe et al. | 418/15 |
| 4,834,560 | 5/1989 | Jacob et al. | 384/461 |
| 4,890,987 | 1/1990 | Sato et al. | 417/310 |
| 4,904,164 | 2/1990 | Mabe et al. | 417/308 |
| 5,138,477 | 8/1992 | Omura et al. | 384/461 |

FOREIGN PATENT DOCUMENTS

| | | | |
|---|---|---|---|
| 2503064 | 7/1976 | Fed. Rep. of Germany | 384/461 |
| 3533316 | 3/1987 | Fed. Rep. of Germany | 384/461 |

Primary Examiner—John J. Vrablik
Attorney, Agent, or Firm—Roger L. May; Raymond L. Coppiellie

[57] ABSTRACT

A scroll-type fluid compressor including a main drive shaft and a clutch assembly. The scroll-type fluid compressor including an external shaft bearing assembly comprising a main drive shaft bearing and a clutch assembly bearing. The clutch assembly bearing includes an inner journal and the main drive shaft bearing mounts directly inside the inner journal such that the clutch assembly bearing forms a housing around the main drive shaft bearing.

6 Claims, 2 Drawing Sheets

EXTERNAL SHAFT BEARING ASSEMBLY

TECHNICAL FIELD

The present invention relates to scroll-type fluid compressors, and in particular to a scroll-type fluid compressor external shaft bearing assembly.

BACKGROUND OF THE INVENTION

Scroll-type fluid compressors are well known in the prior art. U.S. Pat. No. 4,432,708 issued to Hiraga et al discloses an apparatus including two scrolls, each having a circular end plate and a spiral element disposed on each plate. The scrolls are radially offset such that both spiral elements cooperate to make a plurality of contacts between their spiral curved surfaces.

In operation, one of the scrolls is subjected to an orbital motion and the line contacts shift, resulting in a change in the volume of the fluid pockets contained within the scrolls. This change in volume of the fluid pockets is utilized to compress fluids, for example air conditioning fluids needed for operation of the air conditioning system of automobiles.

Prior art compressors such as disclosed in U.S. Pat. No. 4,604,039 to Terauchi and U.S. Pat. No. 4,890,987 to Sato et al include a main drive shaft supported by a main drive shaft bearing. The main drive shaft bearing is comprised of a bearing race and two spaced sets of bearings surrounding the circumference of the main drive shaft. The nose portion of the front cover of the compressor extends around and encloses the outer periphery of the main bearings. A clutch bearing is disposed directly on the outer diameter of the nose portion of the compressor.

The clutch bearing supports the clutch assembly used to induce and control the rotational motion needed to operate the compressor. The compressors disclosed in the Terauchi patent and the Sato et al patent are representative of prior art designs utilizing a dual bearing assembly for rotatably supporting both the main drive shaft and the clutch assembly. Both designs disclose a nose portion located intermediate the clutch bearing and the main drive shaft bearing. It is known in the art that this nose portion is difficult and relatively expensive to machine to rigid dimensional specifications. The precision machining of the nose portion adds expense to the manufacture of the overall compressor.

The main drive shaft bearing and outer pulley bearing in combination with the nose portion of the front cover also create an axial "stack up" of dimensional tolerances. This axial "stack-up" is the cumulative addition of dimensional tolerances of adjacent parts. This cumulative addition causes premature failure of the compressor components and drive belts.

The clutch assembly includes a rotor which rests on the clutch bearing and cooperates with an engagement hub assembly to comprise the main clutch assembly components needed for the compressor's operation. In use, when air conditioning is required inside the automobile the clutch assembly is energized by a switch in the passenger compartment. The clutch assembly is energized and an electromagnet in the clutch assembly creates a magnetic field pulling the engagement hub assembly toward the rotor. The engagement hub assembly and rotor engage and induce rotational movement in the main drive shaft. Eccentric mounting of a drive pin on a disc rotor associated with the main drive shaft induces orbital motion in the scroll., When the air conditioning system is not operating, the engagement hub assembly and rotor are not engaged and the rotor rotates independently from the engagement hub assembly.

Generally, wear occurs between the engagement hub assembly and rotor due to normal operating contact between the engagement hub assembly and rotor. If axial "stack ups" between the main bearing, nose portion and clutch bearing reach a high level, premature wear of the engagement hub assembly, rotor and other compressor components occurs. Axial stack-up also contributes to drive belt misalignment which greatly increases drive belt wear. If axial "stack-up" reaches a critical level, clutch engagement will not occur.

Precise relative positioning of interfacing components is a prerequisite to an acceptable compressor design. Relative parallel positioning or "squareness" as it is sometimes termed is essential for operation of the engagement hub assembly and rotor in the clutch assembly. Axial tolerance "stack up" alters the desired positional relationships and may cause premature wear because of contact between misaligned components. Specifically, any misalignment of the engagement hub assembly and rotor forces one portion of the engagement hub assembly to contact the rotor before the other portion, creating premature wear areas that lead to component failure. This condition decreases the overall life of the engagement hub assembly and rotor and consequently the overall life of the air conditioning compressor in general. Misalignment of the engagement hub assembly and rotor also heightens noise levels and vibration created by the clutch assembly during engagement.

The bearing assembly disclosed in U.S. Pat. No. 4,673,340 to Mabe et al patent depicts a main drive shaft bearing utilizing only one bearing assembly. The pulley bearing disclosed is similar to those disclosed in the Sato et al patent and the Terauchi patent. Again, a machined nose portion extends between the main drive shaft bearing and the pulley bearing. U.S. Pat. No. 4,432,708 to Hiraga et al discussed above discloses yet a third type of bearing assembly. A first bearing is used to support the main drive shaft. This bearing is located on an oversized journal disposed adjacent, but not between, the outer pulley bearing. The design of the nose portion requires machining of both inner and outer dimensions to fit and support the bearing assembly in operation.

SUMMARY OF THE INVENTION

The present invention is directed to a scroll-type fluid compressor bearing assembly. The bearing assembly includes a first main drive shaft bearing used for supporting the main drive shaft of the scroll compressor. A clutch assembly bearing is utilized to support the clutch/pulley mechanism needed to induce orbital motion for operation of the compressor. In the present invention the clutch assembly bearing includes an inner journal configured such that the clutch assembly can be mounted directly on the main drive shaft bearing. Thus, the clutch assembly bearing operates as an outer housing for the main drive shaft bearing.

It is an object of the present invention to provide a scroll-type compressor bearing assembly which reduces axial tolerance "stack ups" between the main drive shaft bearing and clutch assembly bearing.

It is another object of the present invention to provide a scroll-type compressor bearing assembly that allows for the use of a larger bearing which is less expensive than smaller bearing.

It is a further object of the present invention to provide a scroll-type bearing assembly where the clutch assembly bearing mounts directly upon the main drive shaft bearing and acts as a housing for such.

It is still a further object of the present invention to provide a scroll-type bearing assembly which reduces the machining requirements for the housings used to surround the inner components of scroll-type bearing compressors.

It is still yet another further object of the present invention to provide a scroll-type bearing assembly that provides for increased durability of compressor components and an increased drive belt life due to reduction in axial tolerance "stack ups" in the bearing assembly.

Further objects, features and other aspects of this invention will be understood from the detailed description of the preferred embodiment of this invention with reference to the attached drawings.

DETAILED DESCRIPTION OF THE DRAWINGS

Figure 1:
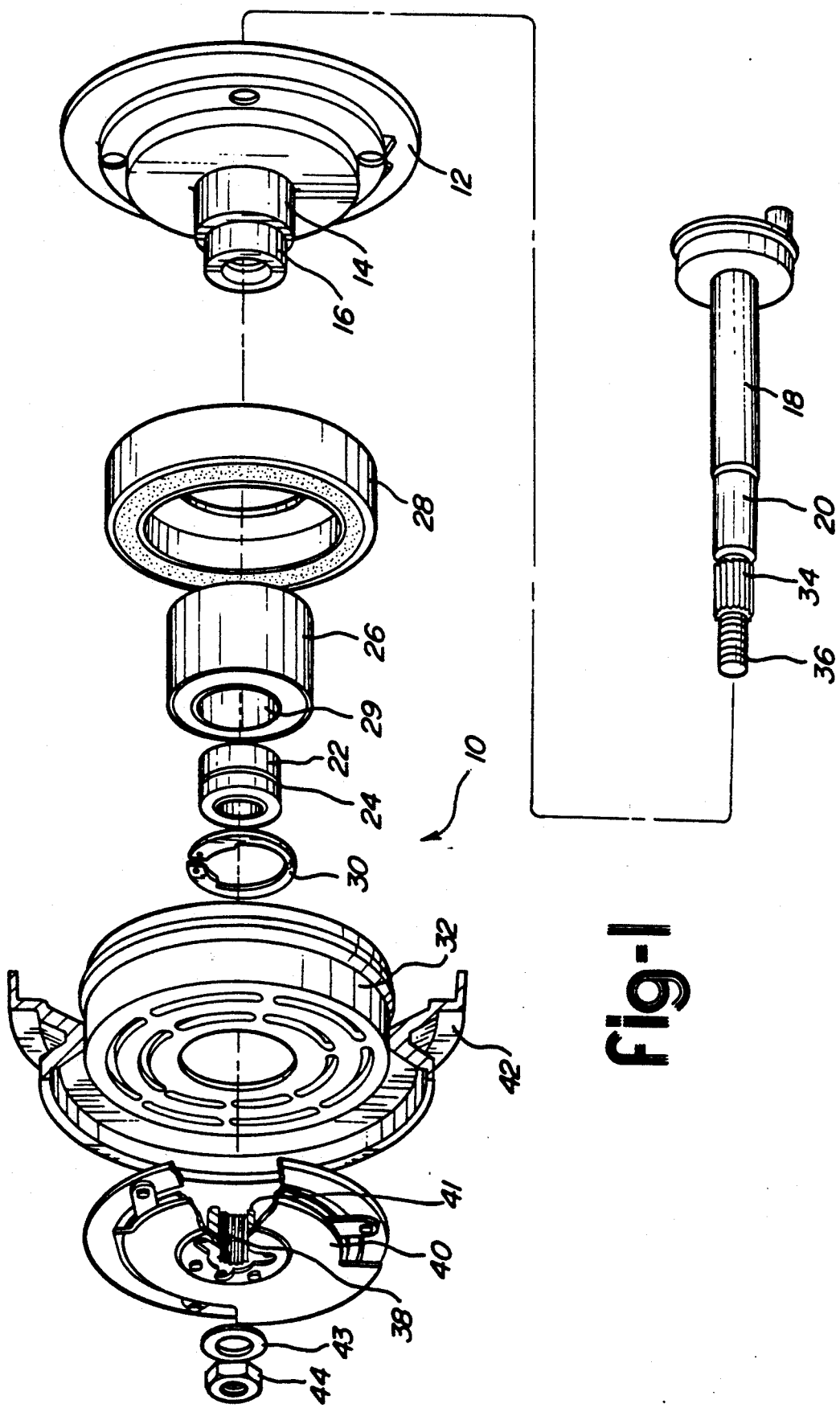
Figure 2:
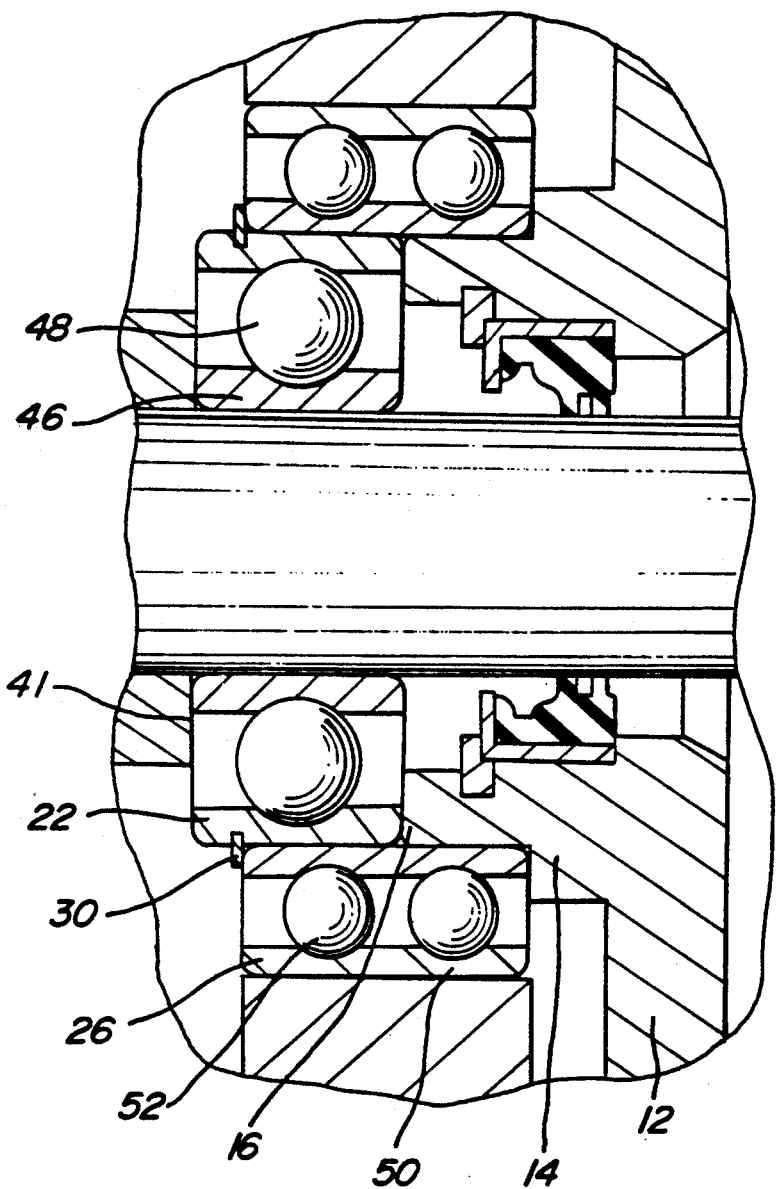

FIG. 1 is an exploded, partial perspective view of a clutch assembly and main drive assembly of a scroll-type compressor utilizing the bearing assembly of the present invention; an FIG. 2 is a partial cross-sectional view of the bearing assembly of FIG. 1.

DETAILED DESCRIPTION OF THE PREFERRED EMBODIMENT

Referring to the attached drawings, in FIG. 1 there is shown generally the front assembly portion of a scroll type air compressor 10, with a front cover 12 and an extending nose member 14. Extending nose member 14 has a bearing contact surface 16. Main drive shaft 18 has a journal surface 20 for accepting main drive shaft bearing 22. Main drive shaft 18 is rotatably supported by main drive shaft bearing 22. A fastener groove 24 extends around the outer circumference of main drive shaft bearing 22. Clutch bearing 26 has an inner journal 29 configured such that main drive shaft bearing 22 is disposed and housed within inner journal 29. A snap ring 30 is affixed within fastener groove 24 on main drive shaft bearing 22. Snap ring 30 locates main drive shaft bearing 22 to the clutch assembly bearing 26. In addition, snap ring 30 further retains main drive shaft bearing 22 and clutch bearing 26 against bearing contact surface 16. Engagement hub assembly 40 has a contact surface 41. Contact surface 41 acts to further secure clutch assembly bearing 26 onto nose member 14.

Electromagnetic coil 28 is mounted onto nose portion 14 and locates inside clutch assembly rotor 32. Main drive shaft 18 includes an connecting portion 34 and a threaded portion 36. Connecting portion 34 extends through clutch assembly rotor 32 and connects to clutch assembly engagement hub assembly 38. Connecting portion 34 of main drive shaft 18 cooperates with a mating portion 38 within clutch assembly engagement hub assembly 40. Clutch assembly pulley 42 is affixed to or an integral part of rotor 32. As shown in FIG. 1, a washer 43 and a nut 44 attach the engagement hub assembly 40 to the drive shaft 22 and secure the entire bearing assembly onto the drive shaft.

In the rotating free state, that is when the air conditioning unit of the automobile is not in use, the drive belt running off the automobile engine is rotating pulley 42 which in turn rotates clutch assembly rotor 32. In the free state, the main drive shaft is not rotating and therefore the scrolls, not shown, are not orbiting and not compressing gas. If the air conditioning system of the automobile is turned on, electromagnetic coil 28 is energized and the magnetic forces induced by the electromagnetic coil bring engagement hub assembly 38 into engagement with clutch assembly rotor 32. At this time, the rotational movement of the rotor induced by the drive belt rotates main drive shaft 18. This rotational movement is translated into orbital movement by various components not shown to operate the inner scrolls for compressing gas.

As shown in FIG. 2, clutch assembly bearing 26 encompasses and houses main drive shaft bearing 22. FIG. 2 shows one embodiment of the present invention where the main drive shaft bearing is a common race 46 and ball bearing 48 combination. A similar race 50 and ball bearing 52 form the clutch bearing 26. It is contemplated that other rolling load bearing members can be utilized with the design of the present invention, such as needle bearings or pin bearings.

In addition, because nose portion 14 does not extend between the main drive shaft bearing 22 and clutch assembly bearing 26, a larger main drive shaft bearing can be utilized with a larger inner ball bearing. As is known in the art, larger ball bearings and larger bearing races are less expensive than smaller ball bearings and smaller bearing races utilized in smaller bearing assemblies. This larger bearing also increases overall main drive shaft bearing life and thereby extends the overall life of the air conditioning compressor. The nose portion 14 of front cover 12 does not extend between the main drive shaft bearing 22 and clutch assembly bearing 24. Thus the nose portion 14 of the present invention does not require expensive machining to achieve close tolerances. In addition, dimensional tolerances associated with the machining of nose portion 14 are no longer added cumulatively with the dimensional tolerances of main drive shaft bearing 22 and clutch assembly bearing 26.

Axial tolerance "stack ups" between main drive shaft bearing 22 and clutch assembly bearing 26 are significantly reduced because of the direct contact between the two bearings. This reduction in actual tolerance "stack up" reduces detrimental squareness or misalignment conditions that occur between the engagement hub assembly and rotor. This misalignment often contributes to premature wear of the clutch assembly. Because clutch bearing 26 and main drive shaft bearing 22 are in direct contact, the overall squareness of the bearing assembly is improved.

Because actual tolerance "stack ups" are greatly reduced, premature wear of the engagement hub assembly and rotor are reduced thereby expanding the overall life of the air compressor. Specifically, a reduction in dimensional axial "stack up" produces a better alignment of the engagement hub assembly and rotor of the air compressor. A better alignment between the engagement hub assembly and rotor produces a larger surface area upon engagement of the clutch and rotor together when the electromagnetic clutch is activated. Because a larger surface area is making contacting between the engagement hub assembly and rotor upon engagement of the electromagnetic clutch, the total wear or removal of small particles from the clutch and rotor upon engagement is spread out over this larger surface area. As stated previously, when the rotor and engagement hub assembly are aligned incorrectly due to axial stack ups, a portion of the engagement hub assembly will contact the rotor first at a tangential angle. This causes wear areas that deteriorate more quickly than other surface areas contained on the engagement hub assembly. Over time this condition produces premature wear of the entire clutch assembly.

In addition to overall clutch assembly wear, axial stack-ups can produce a misalignment of the drive belt. Misalignment of the drive belt causes increased drive belt wear and shortens the useful life of the drive belt. A reduction in axial stack-up will correspondingly reduce misalignment conditions causing increased drive belt wear. This reduction in drive belt wear will reduce maintenance and replacement costs associated with air conditioning compressors used in conjunction with internal combustion engines in automobiles.

This invention has been described in detail in connection with the illustrated preferred embodiments. These embodiments, however, are merely for example only and the invention is not restricted thereto. It will be easily understood by those skilled in the art that other variations and modifications can be easily made within the scope of this invention, as defined by the appended claims.

I claim:

1. A scroll-type fluid compressor including a main drive shaft and a clutch assembly, comprising;
   a main drive shaft bearing for receiving the main drive shaft, wherein said main drive shaft bearing includes an outer diameter mounting surface forming a fastener groove defined therewithin;
   a clutch assembly bearing for rotatably supporting the clutch assembly, the clutch assembly bearing having an inner journal, said clutch assembly bearing being mounted directly on said main drive shaft bearing such that said inner journal is disposed adjacent to the main drive shaft bearing, thereby forming a housing for said main drive shaft bearing; and
   a fastener for securing said clutch assembly bearing to said main drive shaft bearing, wherein said fastener is disposed at least partially around the circumference of said main drive shaft baring and is configured to cooperate with said fastener groove.

2. A scroll-type fluid compressor as in claim 1 wherein said main drive shaft bearing further comprises a shaft bearing race and a plurality of rolling load bearing members disposed within said shaft baring race.

3. A scroll-type fluid compressor as in claim 1 wherein said clutch assembly bearing further comprises a clutch assembly bearing race and a plurality of rolling loaded bearing members disposed within said clutch assembly bearing race.

4. A scroll-type fluid compressor including a main drive shaft, a clutch assembly, and a front cover housing, comprising:
   a main drive shaft bearing for rotatably supporting the main drive shaft, wherein said main drive shaft bearing includes another diameter mounting surface having a fastener groove dispose thereon;
   a cylindrical whose portion associated with said front cover housing and adjacent to said main drive shaft bearing; and
   a clutch assembly bearing for rotatably supporting the clutch assembly having an inner journal, said clutch assembly bearing being mounted directly on said main drive shaft bearing such that said inner journal is disposed adjacent to said main drive shaft bearing thereby forming a housing in combination with said noise portion for supporting said main drive shaft bearing; and
   a fastener for securing said clutch assembly bearing to said main drive shaft, wherein said fastener is an engagement means disposed at least partially around said main drive shaft bearing and is configured to cooperate with said fastener groove.

5. A scroll-type fluid compressor as in claim 4 wherein said main drive shaft bearing further comprises a shaft bearing race and a plurality of rolling load bearing members disposed within said shaft bearing race.

6. A scroll-type fluid compressor as in claim 4 wherein said clutch assembly bearing further comprises a clutch assembly bearing race and a plurality of rolling load bearing members disposed within said clutch assembly bearing race.

* * * * *

UNITED STATES PATENT AND TRADEMARK OFFICE
CERTIFICATE OF CORRECTION

PATENT NO. : 5,228,845
DATED : July 20, 1993
INVENTOR(S) : Duane F. Steele

It is certified that error appears in the above-indentified patent and that said Letters Patent is hereby corrected as shown below:

Column 3, line 27, after "invention;" delete "an" and substitute --and--.

Column 5, line 28, Claim 1, delete ";" and substitute --:--.
Column 6, line 1, Claim 1, after "shaft" delete "baring" and substitute --bearing--.
Column 6, line 17, Claim 4, after "includes" delete "another" and substitute --an outer--.
Column 6, line 18, Claim 4, after "groove" delete "dispose" and substitute --disposed--.
Column 6, line 19, Claim 4, after "cylindrical" delete "whose" and substitute --nose--.
Column 6, line 28, Claim 4, after "said" delete "noise" and substitute --nose--
Column 6, line 10, Claim 3, after "rolling" delete "loaded" and substitute --load--.

Signed and Sealed this

Second Day of August, 1994

Attest:

BRUCE LEHMAN

*Attesting Officer*    *Commissioner of Patents and Trademarks*